United States Patent [19]

Visbach

[11] 4,174,735
[45] Nov. 20, 1979

[54] METHOD OF TEMPORARILY SEALING OPEN ENDS OF FLUID CONDUITS TERMINATING IN A HEADER SPACE

[75] Inventor: Dirk M. Visbach, Rijswijk, Netherlands

[73] Assignee: B.V. Neratoom, The Hague, Netherlands

[21] Appl. No.: 755,206

[22] Filed: Dec. 29, 1976

Related U.S. Application Data

[63] Continuation-in-part of Ser. No. 597,461, Jul. 21, 1975, abandoned.

[30] Foreign Application Priority Data

Dec. 31, 1975 [NL] Netherlands .......................... 7515226

[51] Int. Cl.² .................. F28F 11/00; F16L 55/18
[52] U.S. Cl. .................... 138/97; 29/157.4; 73/40.7; 138/89; 165/76; 277/1
[58] Field of Search ............. 29/157.4, 401 A, 401 C; 277/1; 138/97, 89; 165/1, 76; 73/40.7

[56] References Cited

U.S. PATENT DOCUMENTS

| | | | |
|---|---|---|---|
| 2,646,065 | 7/1953 | Tyson | 277/1 |
| 3,279,902 | 10/1966 | Gardner | 29/157.4 |
| 3,298,398 | 1/1967 | Smith | 138/94 |
| 3,310,615 | 3/1967 | Bender | 138/89 X |
| 3,331,608 | 7/1967 | Churrault | 277/135 |
| 3,340,336 | 9/1967 | Bender | 138/89 X |
| 3,400,759 | 9/1968 | Legrand | 29/157.4 |
| 3,623,337 | 11/1971 | Tremont | 138/97 |
| 3,910,298 | 10/1975 | Shotmeyer | 138/97 |
| 3,958,607 | 5/1976 | Gray | 138/97 |
| 3,962,767 | 6/1976 | Byerley | 138/97 |
| 4,017,952 | 4/1977 | Nemato | 29/401 A |

Primary Examiner—William Price
Attorney, Agent, or Firm—Kenyon & Kenyon

[57] ABSTRACT

A method of temporarily sealing off the open ends of a plurality of fluid transport conduits that terminate in a common header space. A sealant material in the liquid state, preferably enclosed in a flexible envelope of non-permeable resilient material, is introduced through an access opening into the header space of, for example, a multi-tube heat exchanger. Sufficient sealant material is introduced to at least partially fill the header so as to close off the openings to the desired number of fluid transport conduits (e.g., heat exchanger tubes). The sealant is subsequently converted to the solid state, thereby providing simultaneously a firm, vacuum-tight seal for the end of each conduit to permit, for example, the identification of a leaking tube by conventional vacuum testing techniques. Following completion of such test procedures, the sealant material can be removed from the header by first reliquefying it, and then draining the sealant material from the header. If the sealant material is enclosed in an envelope, the envelope, containing sealant material in liquid form, is withdrawn through the access opening; thereby preventing any residue of sealant material from remaining in the header.

9 Claims, 3 Drawing Figures

METHOD OF TEMPORARILY SEALING OPEN ENDS OF FLUID CONDUITS TERMINATING IN A HEADER SPACE

CROSS-REFERENCE TO RELATED APPLICATIONS

This is a continuation-in-part of U.S. patent application Ser. No. 597,461 by the same inventor, filed on July 21, 1975, and now abandoned.

BACKGROUND OF THE INVENTION

1. Field of the Invention

The present invention relates to a method for temporarily sealing the open ends of a plurality of fluid transport conduits that terminate in a common header space. In particular, the invention relates to a method for simultaneously sealing off the ends of heat exchanger tubes at their junction with a common header space to permit, for example, identification of a leaking tube by conventional vacuum testing techniques.

2. Background of the Invention

In apparatus of the general type having a number of elongated fluid transport means arranged with open first ends terminating in a common header space, such as a heat exchanger, a leak may develop in one of the conduits which will allow fluid on one side of the conduits to contaminate fluid on the other side. It then becomes necessary to identify which tube is leaking, so that it may be quickly replaced or repaired.

The usual procedure for determining which is the leaking tube involves temporarily closing off one end of each of the tubes individually with a rubber seal, a blank flange, or an equivalent device for providing a vacuum-tight seal. A detection device and a vacuum pump or other vacuum source are then connected to the other end of each of the conduits in turn, while the exterior of the conduits is surrounded with a detectable gas. If the conduit is sound, no gas will penetrate to the interior, and the detection device will not indicate. On the other hand, if there is any leak in the wall of the conduit, the gas will be sucked through the leak into the interior of the conduit and will actuate the detection device, thus identifying the defective conduit.

Although the conventional method of sealing each conduit end individually is satisfactory for apparatus in which there are relatively few conduits and the ends are easily accessible, this procedure becomes time consuming and difficult if the apparatus contains a large number of conduits, or if partial disassembly is required to gain access to the conduit openings in the header space.

In particular, this procedure presents severe problems in the case of a heat exchanger for generating steam in a sodium-cooled nuclear reactor plant. A typical steam generator for such a plant may comprise a heat exchanger having as many as 70 tubes of small internal diameter (e.g., 20 mm). The tubes extend through a sodium compartment, with one end of each tube terminating in a common feedwater header and the other terminating in a common steam header. Liquid sodium, heated in the reactor, circulates through the sodium compartment and transfers its heat through the tube walls to water flowing from the feedwater header into the tubes. The heated water emerges as steam from the other ends of the tubes into the steam header; from there it may flow to a steam turbine.

Proper and safe operation of the nuclear plant demands that any leak which may occur in the heat exchanger tubes be corrected as soon as possible to prevent any significant contact between the water or steam inside the tubes and the liquid sodium outside the tubes in the sodium compartment. Thus, when a leak occurs it is desirable to identify the faulty tube as quickly as possible; so that it can be replaced, repaired, or permanently sealed off. Because of the relatively large number of tubes and because the tubes are not readily accessible through the feedwater header, the conventional procedure of individually closing off the tube ends with rubber plugs or blind flanges is time consuming and expensive.

SUMMARY OF THE INVENTION

It is an object of the present invention to provide a method for quickly and simultaneously sealing the open ends of fluid transport conduits at their junction with a common header.

It is further object of the invention to provide a method for temporarily sealing the ends of a plurality of heat exchanger tubes at their junction with a header wall by means of a sealant material to permit leak testing, the sealant material being removable from the header space at the conclusion of the leak tests.

These and other objects are accomplished by the present invention, which comprises, completely filling a header space from a level below the lowest open end of a multiplicity of fluid transport conduits terminating in the header to a level above the highest open end of the multiplicity of fluid transport conduits with a sealing material in liquid form and then converting the sealing material to solid form, thereby sealing the end of each conduit to permit testing the conduits for leaks. The method further includes removing the sealant material from the header space after the leak tests are completed, preferably by first converting the solid sealant material back into liquid form.

The method of the invention can be practiced with several different types of sealing material. For example, the sealant may be a plastics material which is introduced into the header in liquid form and then cured (i.e., polymerized) to become solid. Alternatively, the sealant material may be liquid at the normal ambient temperature, the sealant being cooled to the solid state after its introduction into the header.

Most preferably, however, the sealant is a solid at normal ambient temperatures and is heated above its melting point before introduction into the header in liquid form. When the material inside the header cools down to the ambient temperature, it then resolidifies. After completion of the test procedure, the sealing material can be reheated above its melting point and then removed in liquid form from the header space. Examples of preferred sealing materials of this latter type are wax, Wood's alloy, and (most preferably) paraffin.

In order to minimize the amount of sealing material required to seal the ends of the conduits, the method of the invention further comprises the preliminary steps of introducing an inflatable member into the header below the lowest open end of the fluid transport means and inflating the member prior to filling the header with the sealing material to close the header below said ends and prevent the sealing material from flowing down below the level of the lowest conduit ends. After the sealing material has been removed from the header, the member is deflated and also removed."

Although the method may be practiced by introducing the sealing material directly into the header space, in many cases this is undesirable because of the difficulty in subsequently removing all of the material from the header space and the adjacent ends of the conduits. Particularly in the case of steam generators for sodium-cooled nuclear reactor plants, it is essential that all traces of such materials be removed from the interior of the tubes and headers. Since there are so many tubes, which are difficult of access, in a nuclear reactor steam generator, the cleansing procedure may therefore be extremely lengthy and very expensive.

The method of the invention preferably includes the further improvement, therefore, of introducing the sealant material into the header in a flexible envelope of non-permeable, resilient material. The flexible, non-permeable, resilient material of the envelope may be rubber or a suitable synthetic plastic, depending on the temperature ranges and sealing material used in the method. It is important, of course, that the material of the envelope withstand such temperature range and remain resilient and non-permeable to the sealing material.

By enclosing the sealant material in a non-permeable envelope, the preferred method ensures that no residue of sealant material will be left in the header or fluid transport conduits after the envelope has been removed. At the same time, the flexibility of the envelope permits close, sealing contact with the header wall around the opening to each conduit.

The foregoing and other advantages of the method of the present invention will be apparent from the description of the preferred embodiments, in conjunction with the accompanying drawings.

DESCRIPTION OF THE PREFERRED EMBODIMENTS

Figure 1:
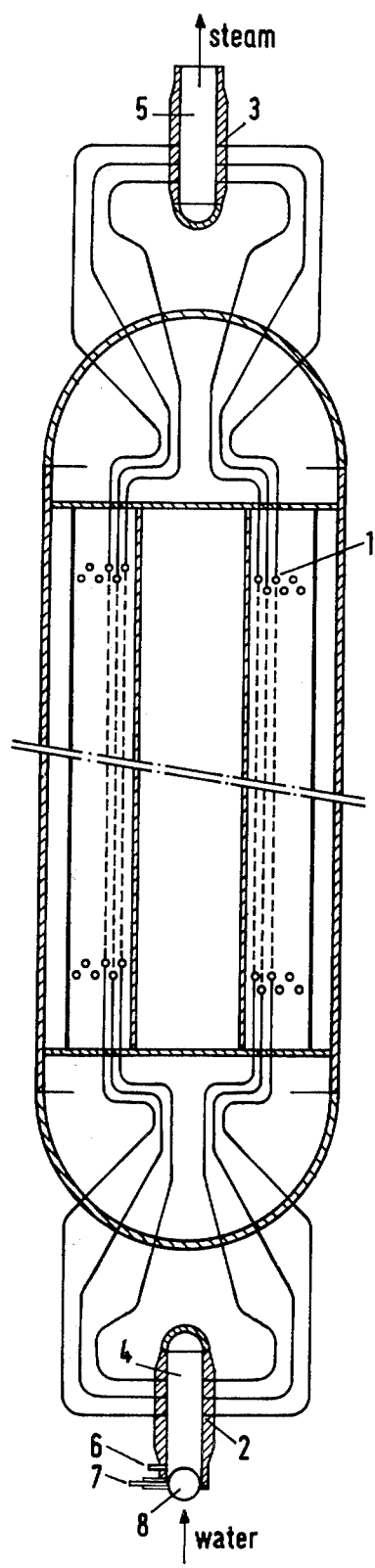
FIG. 1 is a schematic drawing of a heat exchanger adapted for use as a steam generator in a sodium-cooled nuclear reactor plant.

With reference to FIG. 1, a heat exchanger suitable for use as a steam generator in a sodium-cooled nuclear reactor plant is shown schematically as including a multiplicity of elongated fluid transport conduits 1, in the form of heat exchanger tubes having first ends 2 and second ends 3, terminating, respectively, in a first common header space 4 and a second common header space 5. Although only a few tubes are shown, it will be appreciated that there may be a large number, for example, 70, of such tubes.

In operation, the first header 4 is connected to a feedwater supply line (not shown), the second header 5 is connected to a steam line (not shown), and pipes 1 are surrounded by liquid sodium circulating through the shell side of the steam generator.

When a leak has been detected in the heat exchanger (by known methods), the water supply is shut off, and the pipes and the sodium compartment are emptied. After this, the pipes can be filled with an inert gas to prevent a reaction at the leak spot between sodium residues and oxygen present in the air. Next, the second header 5 is separated from the steam line, so that the second ends 3 of pipes 1 become accessible. These ends are sealed, for example, with rubber.

The foregoing steps are all part of the conventional procedure. Normally then, the first header 4 will be separated from the water supply line to permit access to the first ends 2 of all the heat exchanger tubes. In the conventional method, these tubes are then individually sealed with rubber seals, blind flanges, or the like to provide a vacuum-tight seal.

After this, the empty sodium compartment is filled with a detectable gas, such as helium, which should be different from the inert gas filling the tubes, and the second ends 3 of the tubes are connected, one by one in sequence, to a detection device including a vacuum pump and a gas detector (not shown). If any pipe has a leak, the helium or other detectable gases will flow via the leak to the detector, thereby identifying which tube or tubes must be repaired or replaced.

The improved method of the present invention eliminates the need to open up the first header to gain access to the first ends of the heat exchanger tubes. It further eliminates the time-consuming chore of installing sealing devices individually into the open end of each tube.

Figure 2:
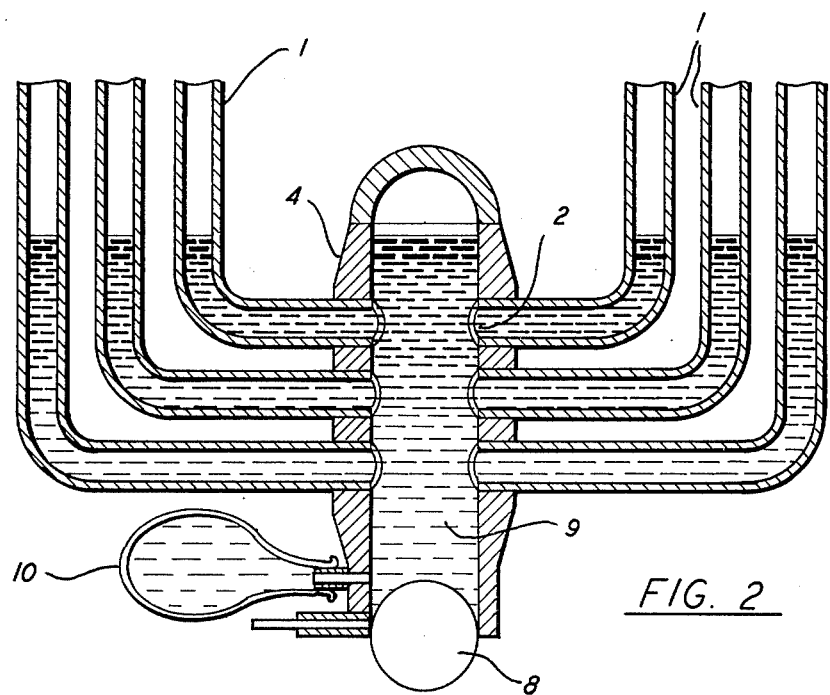
FIG. 2 is an enlarged view of one of the headers of the heat exchanger in FIG. 1 showing sealing material in liquid form introduced directly into the header and adjacent ends of the heat exchanger tubes.

As shown in the enlarged view of the first header in FIG. 2, the first header 4 is merely filled with a sealing material 9 in liquid form, from a level below the lowest conduit to a level above the highest conduit. The sealing material is introduced through an acess opening, such as tube 6, which is otherwise sealed off by a blind flange or other positive sealing member (not shown).

A preferred sealant material for use in practicing the invention is paraffin, which is a solid at normal ambient temperatures. The paraffin (or other sealing material) can be introduced into header 4 by sliding the neck of a rubber balloon 10, filled with paraffin heated above its melting point, over the tube 6, as shown. When pressure is exerted on the balloon, the liquid paraffin will flow into the header. As soon as it cools down to the ambient temperature, the paraffin will provide simultaneously, a vacuum-tight seal at the first end 2 of each of the fluid transport conduits 1.

After the leak detection procedure is completed, heat can be applied to the header until the paraffin remelts. The major part of the paraffin will then flow back again into balloon 10. The remainder of the paraffin, however, must be removed by circulating hot water through the system and then separating the paraffin from the water.

The amount of residual paraffin, or other sealing material, remaining in the header can be minimized by providing a valve (not shown), just below access tube 6; so that the sealant will not flow down into the water supply line. Alternatively, and preferably, the portion of the header below the tube ends 2 can be closed off to sealant material by inserting a balloon 8 (in deflated condition) through another access opening 7 located below opening 6. The balloon is then inflated until it contacts the entire inner circumference of header 4. After the sealant material is removed (as described above), the balloon can be deflated and withdrawn, and opening 7 capped with a blind flange or other sealing device.

Figure 3:
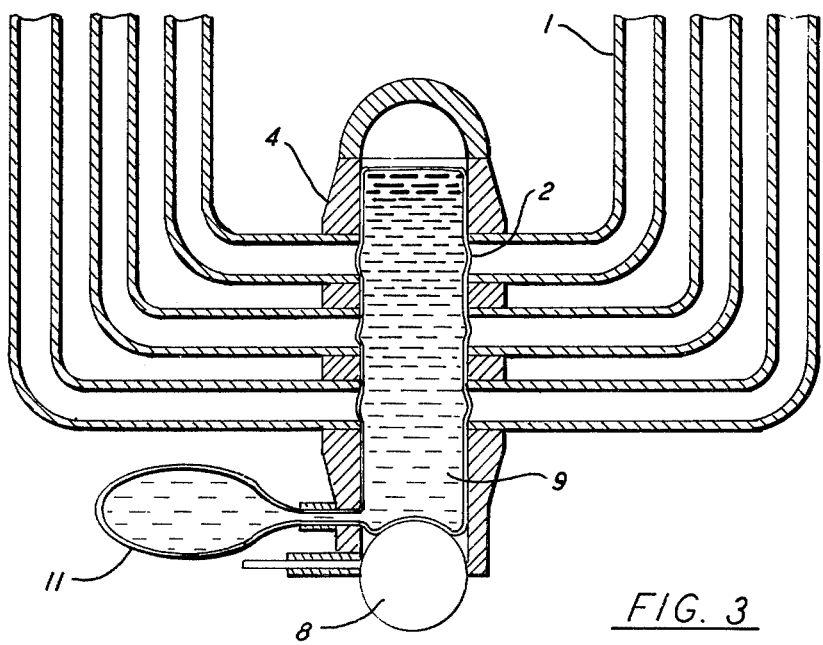
FIG. 3 is a view of the header of FIG. 2 in which the sealing material is being introduced into the header in a flexible envelope of non-permeable, resilient material.

Even with the use of an inflated balloon, some residue of sealing material will still remain in the header. Furthermore, a substantial amount of excess sealant is required to fill the ends of the fluid transport conduits to the same level as in the header. To obviate these problems, the alternative method shown in FIG. 3 may be used. In this method, the sealant material 9 in liquid form, is introduced through access opening in a flexible envelope 11 of non-permeable, resilient material, such as rubber or a suitable synthetic plastic. The flexiblity of the envelope permits it to be squeezed through the access opening and then to expand to fill the header, as shown in FIG. 3. At the same time, the envelope bridges across the open ends of the tubes so that less sealing material is required to reach the same level inside the header. All other steps of the method, as previously described, are applicable to the use of the envelope except, of course, when the envelope, with the sealing material inside, is removed, there is no residual sealant left in the header or pipes to be cleaned out.

The improved sealing method of the present invention also provides an improved method for identifying leaking conduits in an apparatus having a multiplicity of fluid transport conduits with first ends terminating in a common header space. This improved leak detection method comprises sealing the first ends of the conduits by the sealing method of the invention, successively connecting each of the second ends of the fluid transport conduits to a detecting apparatus comprising a vacuum pump and a gas detector and surrounding the conduits with a detectable gas to provide an indication on the detector of each leaking conduit, and subsequently unsealing the first ends of the conduits.

What is claimed is:

1. A method of temporarily sealing vacuum-tight a multiplicity of elongated fluid transport conduits to permit detection of leaks in said conduits, said transport conduits having unobstructed open first ends terminating in a common header space, the method comprising:
   completely filling the header space from a level below the lowest open first end to a level above the highest open first end of the multiplicity of fluid transport conduits with a sealing material in liquid form in sufficient quantity to cover the open first ends;
   subsequently causing the sealing material to solidify, thereby sealing the first end of each transport means with said solidified sealing material;
   reliquefying said sealing material after completing detection and repair of leaks in said conduits; and
   removing said reliquefied sealing material from the header space.

2. The method of claim 1 wherein the sealing material is a substance which is solid below an ambient temperature which is the normal temperature in the space surrounding the header, and the sealing material is liquid at a temperature slightly elevated above said predetermined temperature.

3. The method of claim 2 wherein the sealing material comprises paraffin.

4. The method of claim 1 wherein the step of filling the header space with a sealing material in liquid form comprises introducing the sealing material in liquid form into the header space in a flexible envelope of non-permeable resilient material.

5. The method of claim 4 wherein the further steps subsequent to converting the sealing material to solid form comprise reconverting the sealing material to liquid form and removing the flexible envelope containing said sealing material from the header space, whereby no residual sealing material remains in the header space or the adjacent open ends of the fluid transport conduits.

6. A method of temporarily sealing vacuum-tight a plurality of elongated hollow tubes for heat exchange fluid in a heat exchanger to permit detection of leaks in said tubes, said tubes having unobstructed open ends terminating in a common header, the method comprising:
   heating to above its melting point a sealing material having a melting point preselected to be slightly elevated above the temperature of the tubes and header;
   introducing sufficient quantity of the molten sealing material into the header to completely fill the header from a level below the lowest open end of the tubes to a level above the highest open end of said plurality of transport tubes so as to cover the unobstructed open ends of all tubes;
   allowing the sealing material to cool to the temperature of the header and tubes to provide a vacuum-tight plug of solid sealing material covering each of the otherwise unobstructed open ends of the tubes, thereby avoiding the need for installing separate mechanical sealing means in the open end of each tube;
   reliquefying said sealing material after completing detection and repair of leaks in said tubes; and
   removing said reliquefied sealing material from the header space.

7. The method of claim 6 wherein the step of introducing the molten sealing material into the header comprises introducing the sealing material within a flexible envelope of non-permeable, resilient material.

8. The method of claim 7 wherein the further steps subsequent to allowing the sealing material to cool comprise reheating the sealing material to above its melting point and removing the flexible envelope containing said sealing material from the header, whereby no residual sealing material remains in the header space or the adjacent open ends of the fluid transport conduits.

9. The method of claim 7 further comprising: introducing an inflatable member into the header below the unobstructed first ends of the plurality of tubes; and inflating the member prior to filling the header with the sealing material to close the header below the first ends of the tubes.

* * * * *